United States Patent
Janssen et al.

(10) Patent No.: US 10,630,106 B2
(45) Date of Patent: Apr. 21, 2020

(54) MULTI-LEVEL CONTROLLER SYSTEMS AND METHODS FOR CONTROLLING A PHYSICAL ASSET

(71) Applicant: General Electric Company, Schenectady, NY (US)

(72) Inventors: Timothy Lee Janssen, Schenectady, NY (US); Benjamin Laskowski, Greenville, SC (US); William Forrester Seely, Greenville, SC (US); John Raffensperger, Greenville, SC (US); Karl Joseph Minto, Greenvile, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/862,250

(22) Filed: Jan. 4, 2018

(65) Prior Publication Data
US 2019/0207419 A1 Jul. 4, 2019

(51) Int. Cl.
*G06F 9/44* (2018.01)
*H02J 13/00* (2006.01)
(Continued)

(52) U.S. Cl.
CPC ...... *H02J 13/0017* (2013.01); *G05B 19/0421* (2013.01); *G05B 19/0426* (2013.01);
(Continued)

(58) Field of Classification Search
CPC .......... G06F 8/71; G06F 9/44521; G06F 8/30; G06F 8/36; G06F 8/66
(Continued)

(56) References Cited

U.S. PATENT DOCUMENTS

2004/0268186 A1\* 12/2004 Maturana ........... G05B 19/4148
714/38.14
2011/0204635 A1 8/2011 Miller
(Continued)

OTHER PUBLICATIONS

Extended European Search Report in EP Application No. 18215740.4-1222, dated Mar. 6, 2019 (8 Pages).

*Primary Examiner* — Chuck O Kendall
(74) *Attorney, Agent, or Firm* — Eversheds Sutherland (US) LLP

(57) ABSTRACT

Exemplary embodiments described in this disclosure pertain to a system that includes a high-level controller coupled to a low-level controller in an arrangement that allows the high-level controller to cooperate with the low-level controller for controlling a power generation unit. The high-level controller generates supplementary signals and/or supplementary code that is provided to a surrogate controller. The surrogate controller uses the supplementary signals and/or supplementary code to generate control software that is provided to the low-level controller for controlling certain operational aspects of the power generation unit that cannot be independently controlled by the low-level controller. If the high-level controller is placed in an independent mode of operation for any reason, the surrogate controller continues to cooperate with the low-level controller for controlling various operations of the power generation unit that were being controlled by the low-level controller prior to the high-level controller entering the independent mode of operation.

20 Claims, 6 Drawing Sheets

(51) Int. Cl.
  *G05B 19/042*  (2006.01)
  *H02J 3/38*  (2006.01)
  *H02P 5/00*  (2016.01)
  *H02P 23/00*  (2016.01)
  *G06Q 50/06*  (2012.01)
  *H02P 9/04*  (2006.01)
(52) U.S. Cl.
  CPC .............. *G06Q 50/06* (2013.01); *H02J 3/381* (2013.01); *H02P 5/00* (2013.01); *H02P 9/04* (2013.01); *H02P 23/0077* (2013.01); *G05B 2219/23008* (2013.01); *G05B 2219/25142* (2013.01)
(58) Field of Classification Search
  USPC .................................................. 717/100–120
  See application file for complete search history.

(56) References Cited

U.S. PATENT DOCUMENTS

| | | |
|---|---|---|
| 2014/0130033 A1 | 5/2014 | Alls |
| 2016/0371584 A1 | 12/2016 | Nicholas |
| 2017/0076235 A1 | 3/2017 | Noto |

\* cited by examiner

MULTI-LEVEL CONTROLLER SYSTEMS AND METHODS FOR CONTROLLING A PHYSICAL ASSET

FIELD OF THE DISCLOSURE

This disclosure generally relates to controller systems, and more particularly, to controller systems and methods for controlling a physical asset such as a power generation unit.

BACKGROUND OF THE DISCLOSURE

Electric power is typically generated in a power plant by using one or more power generation units. A typical power generation unit can include a compressor that provides pressurized air to a combustor where the pressurized air is mixed with fuel and ignited for producing hot combustion gases. The hot combustion gases flow downstream from the combustor and into a turbine where energy is extracted from the hot combustion gases in order to rotate rotor blades that are attached to a shaft. The rotation of the shaft can be used to generate electricity in an electric generator and the generated electricity coupled into an electric grid for distribution to customers.

Interruption in the distribution of electricity to customers, particularly any interruption as a result of a malfunction or poor performance of the power generation unit, can be expensive and frustrating for customers. Consequently, significantly efforts are typically taken to improve reliability and efficiency in the power generation unit as well as in a controller that controls the power generation unit. Towards this end, the hardware and the software used in the controller is often tailored more towards robustness than towards providing an extensive array of features and controls. Nonetheless, it may be desirable at times to replace, upgrade, or repair, some of the existing software in a controller for various reasons. At least some conventional solutions entail stopping of normal operations of the controller in order to do so, thus introducing various risks such as for example, a malfunctioning of the power generation unit or sub-optimal performance of the power generation unit while the controller is offline.

BRIEF DESCRIPTION OF THE DISCLOSURE

Embodiments of the disclosure are directed generally to systems and methods incorporating multi-level controllers that are interconnected with each other in a non-homogeneous arrangement that allows flexible control of a power generation unit.

According to one exemplary embodiment of the disclosure, a system can include a low-level controller, a high-level controller, and a surrogate computing element. The low-level controller is configured to execute a first version of control software for controlling at least a first operational aspect of a physical asset. The high-level controller is configured to generate one or more supplementary signals. The surrogate computing element is configured to receive the one or more supplementary signals from the high-level controller, utilize the one or more supplementary signals to generate a second version of control software, and to provide the second version of control software to the low-level controller, the low-level controller further configured to utilize the second version of control software to control at least a second operational aspect of the physical asset.

According to another exemplary embodiment of the disclosure, a method can include utilizing a low-level controller to execute a first version of control software for controlling at least a first operational aspect of a physical asset; utilizing a high-level controller to generate one or more supplementary signals for controlling at least a second operational aspect of the physical asset; providing the one or more supplementary signals to a surrogate computing element; utilizing the one or more supplementary signals in the surrogate computing element to generate a second version of control software; providing the second version of control software to the low-level controller; and utilizing the low-level controller to execute the second version of control software for controlling at least the second operational aspect of the physical asset.

According to yet another exemplary embodiment of the disclosure, a method can include utilizing a low-level controller to execute a first version of control software for controlling at least a first operational aspect of a physical asset; utilizing a high-level controller to generate a second version of control software for controlling at least a second operational aspect of the physical asset; providing the second version of control software to a surrogate computing element; utilizing the surrogate computing element to provide to the low-level controller, the second version of control software; and utilizing the low-level controller to execute at least one of the first version of control software or the second version of control software for controlling the physical asset.

Other embodiments and aspects of the disclosure will become apparent from the following description taken in conjunction with the following drawings.

BRIEF DESCRIPTION OF THE DRAWINGS

Figure 1:
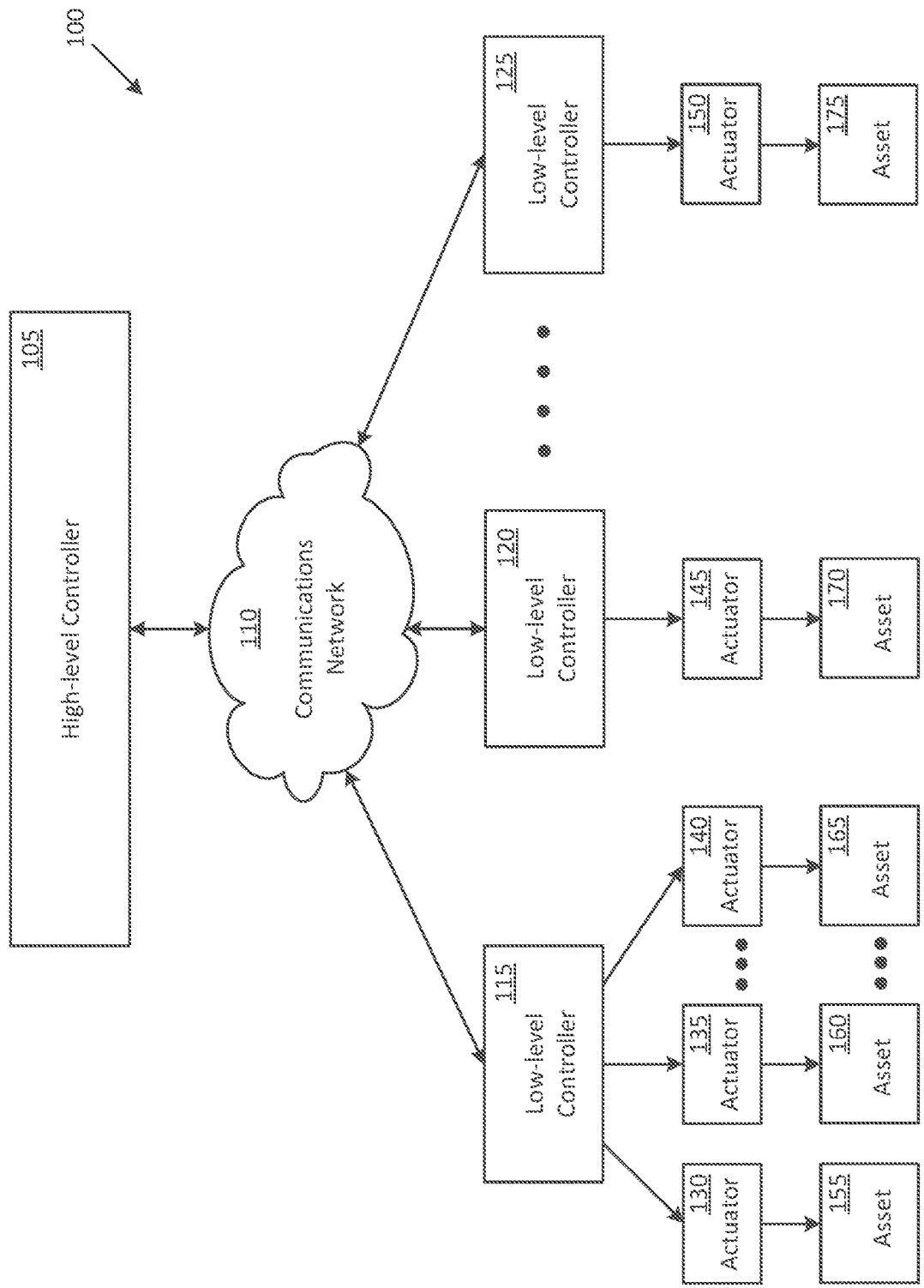

Having thus described the disclosure in general terms, reference will now be made to the accompanying drawings, which are not necessarily drawn to scale, and wherein:

FIG. 1 illustrates an exemplary system that provides for non-homogeneous control of one or more assets in accordance with an exemplary embodiment of the disclosure.

Figure 2:
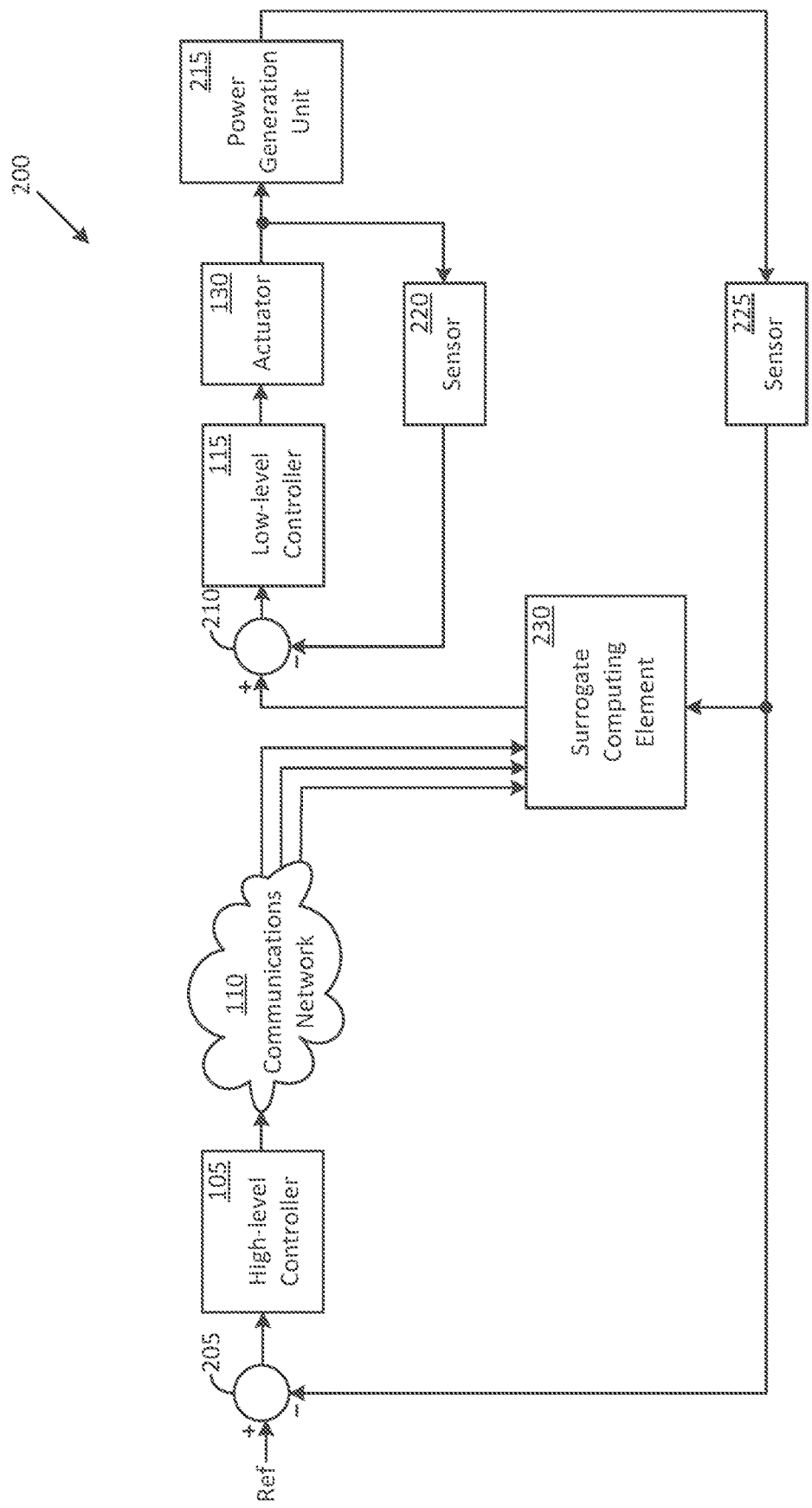

FIG. 2 illustrates an exemplary system that provides non-homogeneous control of a power generation unit in accordance with an exemplary embodiment of the disclosure.

Figure 3:
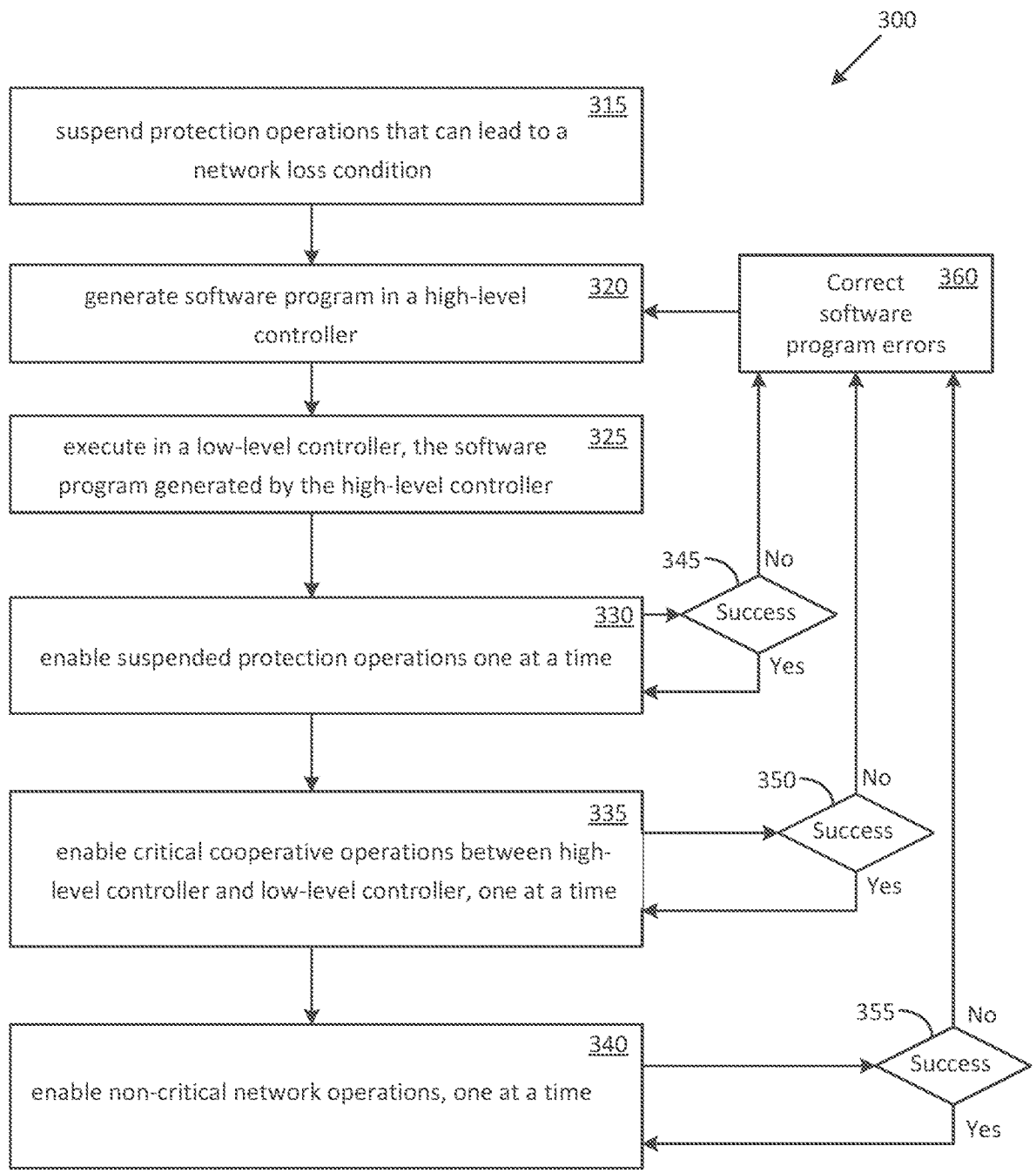

FIG. 3 shows an exemplary flowchart of a method of interaction between a high-level controller and a low-level controller in accordance with an exemplary embodiment of the disclosure.

Figure 4:
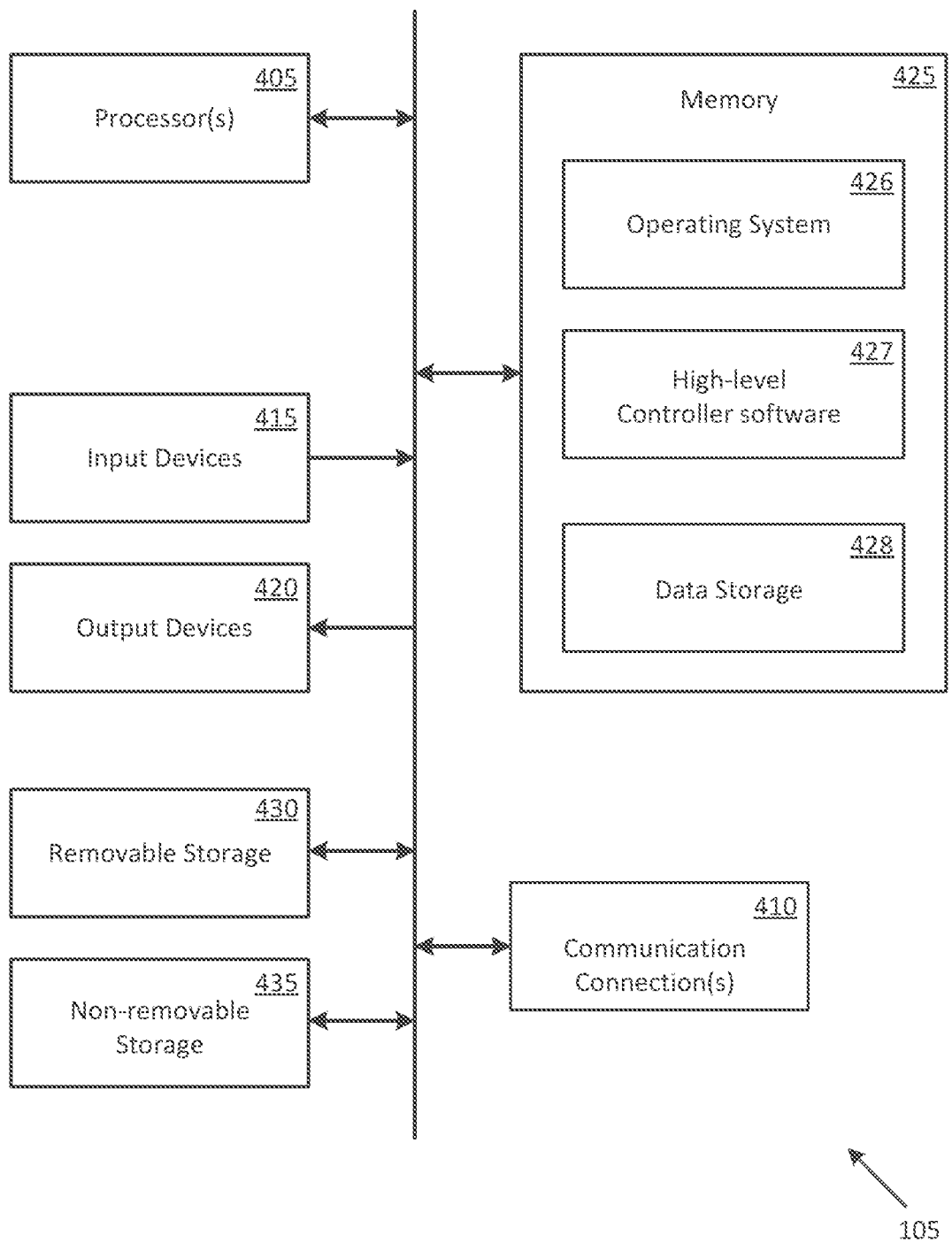

FIG. 4 illustrates some exemplary elements that can be included in a computer configured to operate as a high-level controller in accordance with an exemplary embodiment of the disclosure.

Figure 5:
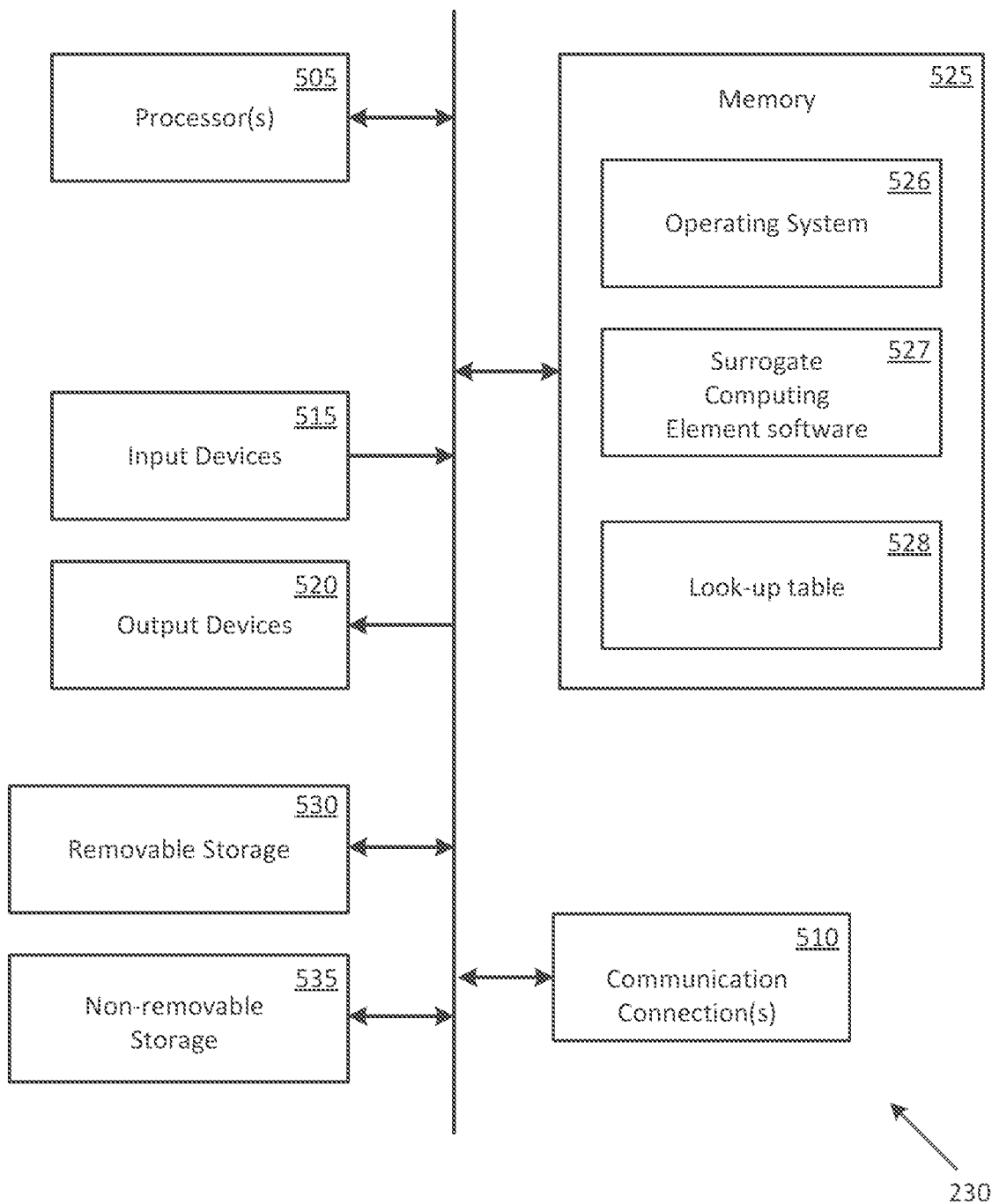

FIG. 5 illustrates some exemplary elements that can be included in a computer configured to operate as a surrogate computing element in accordance with an exemplary embodiment of the disclosure.

Figure 6:
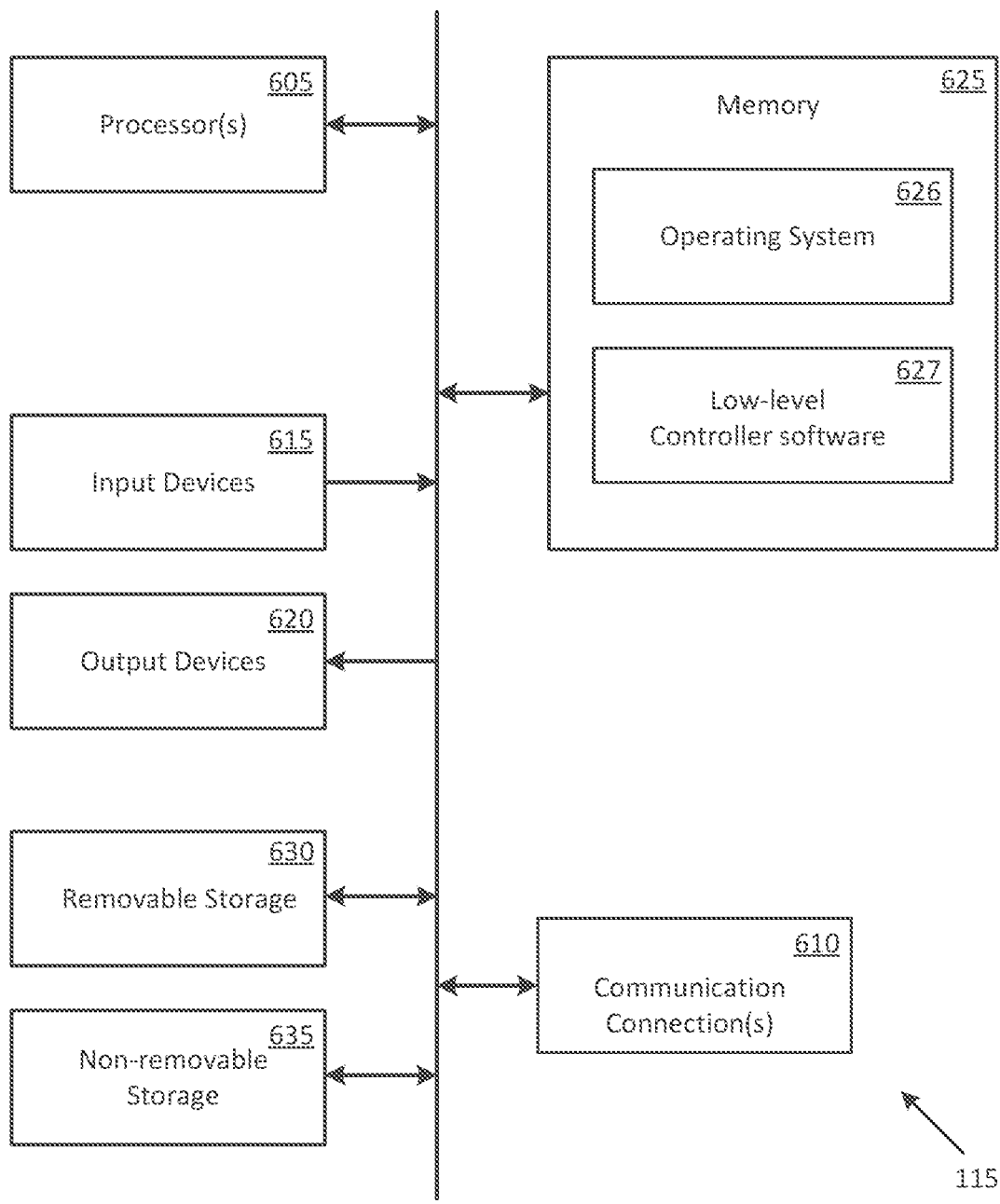

FIG. 6 illustrates some exemplary elements that can be included in a computer configured to operate as the low-level controller in accordance with an exemplary embodiment of the disclosure.

The disclosure will be described more fully hereinafter with reference to the drawings, in which exemplary embodiments of the disclosure are shown. This disclosure may, however, be embodied in many different forms and should not be construed as limited to the exemplary embodiments set forth herein; rather, these embodiments are provided so that this disclosure will satisfy applicable legal requirements. Like numbers refer to like elements throughout. It should be understood that certain words and terms are used herein solely for convenience and such words and terms should be interpreted as referring to various objects and actions that are generally understood in various forms and equivalencies by persons of ordinary skill in the art. Furthermore, the word "example" as used herein is intended to be non-exclusionary and non-limiting in nature. More particularly, the word "exemplary" as used herein indicates one among several examples, and it should be understood that no undue emphasis or preference is being directed to the particular example being described.

DETAILED DESCRIPTION

In terms of a general overview, certain embodiments described in this disclosure pertain to a system having a high-level controller that can be coupled to one or more low-level controllers in an arrangement that allows the high-level controller to cooperate with the low-level controller for controlling a physical asset such as a power generation unit. In one exemplary implementation, the high-level controller generates supplementary signals and/or supplementary code that is provided to a surrogate controller. The surrogate controller uses the supplementary signals and/or supplementary code to generate control software that is provided to the low-level controller for controlling certain operational aspects of the physical asset that may not be independently controlled by the low-level controller. If the high-level controller is placed in an independent mode of operation for any of various reasons, the surrogate controller continues to cooperate with the low-level controller for controlling various operations of the physical asset that were being controlled by the low-level controller prior to the high-level controller entering the independent mode of operation. The term "non-homogeneous" as used herein generally indicates a multi-level controller architecture that allows different types of controllers to cooperate with each other for controlling an asset. The different types of controllers can use different types of hardware and different types of software having different capabilities and different levels of complexity.

Attention is now drawn to FIG. 1, which illustrates an exemplary system 100 that provides for non-homogeneous control of one or more assets in accordance with an exemplary embodiment of the disclosure. The exemplary system 100 can include a high-level controller 105 that is communicatively coupled to one or more low-level controllers, such as a first low-level controller 115, a second low-level controller 120, and an "$n^{th}$" low-level controller 125 (n>1). In another implementation, the high-level controller 105 can be communicatively coupled to a single low-level controller. Each of the low-level controllers can be coupled to one or more actuators that actuate one or more controls (such as a temperature control, a fuel-feed control etc.) of an associated physical asset. In one example implementation, each of a first physical asset 155, a second physical asset 160, and an "$n^{th}$" physical asset 175 (n>1) is a power generation unit. The description hereon refers to the first low-level controller 115 and the asset 155 but it should be understood that the description applies equally well to the other low-level controllers and assets. Furthermore, the asset 155 may be referred to in some instances as a power generation unit, which is one example of an asset that can be operated upon in accordance with various exemplary embodiments of the disclosure.

The communications network 110 used to provide the communicative coupling between the high-level controller 105 and the one or more low-level controllers can be any one or more of various types of communications networks such as the Internet, a private wide-area network (WAN), or a private local area network (LAN).

In accordance with the exemplary embodiment shown in FIG. 1, the high-level controller 105 can be a server computer configured to operate with relatively complex software programs written in a high-level programming language. One example of a relatively complex software program can be a data mining program that is used to process a large quantity of raw data (such as temperature data and/or steam pressure data obtained from one or more power generation units) into useful information (such as for use in mean time between failures calculations, for determining a servicing schedule, or for scheduling a repair ahead of a failure etc.). The high-level controller 105 may include the latest hardware and may allow the software to be changed or updated on a frequent basis (every year, for example). Consequently, the high-level controller 105 may be taken offline or shut down for various reasons such as for upgrades, repairs, or reconfiguration.

On the other hand, the low-level controller 115 can be a computer containing robust and simple hardware configured to operate with relatively simple software programs. In some cases, the simple software programs may be written in a low-level programming language or in firmware. The hardware and software in the low-level controller 115 may be selected on the basis of ensuring that the low-level controller 115 offers a high mean time between failures (MTBF) and controls the asset 155 in a manner that permits the asset 155 to have a high MTBF as well. One example of a relatively simple software program is a control program that provides one or control signals to a cooling system for injecting water to cool an overheated portion of a power generation unit. The low-level controller 115 may include hardware which is highly reliable but may be outdated in some cases. The software may also be outdated. Both the hardware and the software may be selected to prevent the low-level controller 115 from being taken offline or shut down other than in extraordinary circumstances (such as a hardware failure or a natural disaster) so as to avoid interruption in distributing power to customers.

FIG. 2 illustrates an exemplary system 200 that provides non-homogeneous control of a power generation unit 215 in accordance with an exemplary embodiment of the disclosure. The exemplary system 200 can include the high-level controller 105 communicatively coupled to a surrogate computing element 230 via the communications network 110. The surrogate computing element 230 is coupled to the low-level controller 115, which in turn is communicatively coupled to the actuator 130. The actuator 130, which can be one of several actuators, is communicatively coupled to the power generation unit 215. The actuator 130 can also be coupled to an exemplary sensor 220. One or more sensor output signals of the sensor 220 (such as voltage signals and/or current signals) are coupled into a difference element 210. It should be understood that more than one sensor can be coupled to the actuator 130 and similarly utilized.

The surrogate computing element 230 receives one or supplementary signals from the high-level controller 105 via the communications network 110 and one or more sensor output signals from an exemplary sensor 225. The sensor 225, which can be one of various types of sensors such as a pressure sensor, a temperature sensor, or an accelerometer, can be coupled to various parts of the power generation unit 215 for monitoring various operating parameters of the power generation unit 215. The sensor output signal of the sensor 225 can indicate one or more of various performance characteristics of the power generation unit 215. These sensor output signals are not only coupled into the surrogate computing element 230, but also coupled into the high-level controller 105 via a difference element 205. The difference element 205 receives a reference signal (such as a voltage reference or a current reference) and compares the sensor output signal against the reference signal. A difference signal is produced by the difference element 205 when an amplitude of the sensor output signal is different than that of the reference signal. It should be understood that more than one sensor can be coupled to the power generation unit 215 and utilized in a manner similar to that described with reference to sensor 225.

It should also be understood that various elements such as the low-level controller 115, the actuator 130, the sensor 220, the sensor 225, and the surrogate computing element 230 can be communicatively coupled to each other directly via coaxial cables for example, or can be coupled to each other through a communications network such as a local area network (LAN). In one exemplary implementation, the low-level controller 115 and the surrogate computing element 230 may be executed on a common computing platform (such as a single computer system) using the same, or different, types of operating systems and software languages. In another exemplary implementation, the low-level controller 115 and the surrogate computing element 230 may be executed on separate computer systems that are communicatively coupled to each other (via an Ethernet network for example) and may use the same, or different, types of operating systems and software languages.

In contrast, the high-level controller 105 is a distinct entity that has a computing platform (a server computer, for example) that is independent of the surrogate computing element 230 and/or the low-level controller 115. The independent configuration of the high-level controller 105 offers a loose communicative coupling between the high-level controller 105 and the surrogate computing element 230 that facilitates or otherwise encourages continuous operation of the power generation unit 215 even when there is a malfunction or failure in the high-level controller 105 and/or the communications network 110. For example, the loose communication coupling allows software changes to be carried out in the high-level controller 105 without adversely affecting the operation of the surrogate computing element 230 and/or the low-level controller 115. The loose communication coupling also allows the high-level controller 105 to be powered down or reset without compelling the surrogate computing element 230 to power down or reset concurrently.

More particularly, the loose communicative coupling between the high-level controller 105 and the surrogate computing element 230 allows the high-level controller 105 to indirectly access and/or operate upon the power generation unit 215 via the surrogate computing element 230. When the high-level controller 105 becomes unavailable (for example due to a failure or malfunction in the high-level controller 105 and/or the communications network 110), the surrogate computing element 230 operates as a surrogate entity to the high-level controller 105 in at least some aspects.

More particularly, when operating as a surrogate entity, the surrogate computing element 230 continues to execute various operations that were being performed by the surrogate computing element 230 and/or the low-level controller 115 just prior to the high-level controller 105 becoming unavailable. The operations can include one or more operations that were being carried out upon the power generation unit 215 by the high-level controller 105 via the surrogate computing element 230.

In one exemplary operation, the high-level controller 105 provides supplementary signals to the surrogate computing element 230 in order to control an operational aspect of the power generation unit 215. The operational aspect may for example, pertain to operating the power generation unit 215 in a certain manner that will provide better long-term efficiency over a period of time (days, weeks, months, or years, for example). The surrogate computing element 230 receives the supplementary signals and generates a revised software program that is different than a software program that is being currently executed by the low-level controller 115. The revised software program may be provided by the surrogate computing element 230 to the low-level controller 115 in the form of control software. The control software can be executed by the low-level controller 115 to make the power generation unit 215 operate in the manner desired by the high-level controller 105.

A few examples of the types of supplementary signals that can be provided by the high-level controller 105 to the surrogate computing element 230 can include programming code, programming parameters, numerical data, and/or programming instructions. The supplementary signals may be provided by the high-level controller 105 using high-level software code and complex communication protocols. The surrogate computing element 230 may use the supplementary signals to generate software programs in a relatively less complex programming language that can be executed by the low-level controller 115 using simpler and/or outdated hardware.

At a subsequent instant in time, it may be determined (by an engineer, for example) that an update is required to the revised software program previously provided by the high-level controller 105 to the surrogate computing element 230 (and executed by the low-level controller 115). The update may be required and/or recommended for various reasons such as to remedy one or more shortcomings or defects in the revised software program previously provided by the high-level controller 105 or to supplement the revised software program previously provided by the high-level controller 105.

Accordingly, a new set of supplementary signals can be generated in the high-level controller 115 and provided to the surrogate computing element 230. The surrogate computing element 230 uses the supplementary signals to generate an updated software program for updating the software program being currently run by the low-level controller 115.

However, if a failure or malfunction occurs in the high-level controller 105 or the communications network 110 during the time the surrogate computing element 230 is in the process of receiving the supplementary signals from the high-level controller 105, the surrogate computing element 230 jettisons the changes being carried out and allows the low-level controller 115 to continue using the previously-provided revised program without an update being carried out. The surrogate computing element 230 thus operates as a buffer entity between the high-level controller 105 and the low-level controller 115 to prevent and/or minimize any failure, malfunction, and/or interruption of operations by the low-level controller 115 and consequent failure or interruption of operations in the power generation unit 215.

In another exemplary operation, the high-level controller 105 provides to the surrogate computing element 230, a replacement software program that is directed at replacing an existing software program being used by the low-level controller 115 to control the power generation unit 215. The surrogate computing element 230 receives the replacement software program from the high-level controller 105 and generates a secondary software program that includes instructions to the low-level controller 115, such as how and when to replace the existing software program. The secondary software program is provided by the surrogate computing element 230 to the low-level controller 115, which uses the secondary software to replace the existing software program and to operate the power generation unit 215 in the manner directed by the high-level controller 105 via the surrogate computing element 230.

Here again, if a failure or malfunction occurs in the high-level controller 105 or the communications network 110 during the time the surrogate computing element 230 is in the process of receiving the replacement software program from the high-level controller 105, the surrogate computing element 230 refrains from providing the secondary software program to the low-level controller 115, thereby allowing the low-level controller 115 to continue using the previous software program without interruption.

In yet another exemplary operation, the high-level controller 105 is placed in an independent mode of operation, for example when communications between the high-level controller 105 and the surrogate computing element 230 is unavailable (due to a failure or malfunction, for example) or intentionally disabled (by an engineer, for example). The supplementary signals and/or one or more software programs can be generated by the high-level controller 105 when in the independent mode of operation and provided to the surrogate computing element 230 at a later instant in time when communication between the high-level controller 105 and the surrogate computing element 230 is re-established.

In one or more of the exemplary operations described above, the high-level controller 105 can determine an operating characteristic or operating condition of the power generation unit 215 from the sensor signal outputs of the sensor 225. These sensor signal outputs are coupled into the surrogate computing element 230 via the difference element 205 as described above. Thus, the high-level controller 105 may be made aware of a failure or malfunction in the power generation unit 215 as a result of executing a certain version of software, for example.

The surrogate computing element 230 can include a processor and a look-up table for use in one or more of the exemplary operations described above. The surrogate computing element 230 may use the look-up table to translate one or more supplementary signals provided by the high-level controller 105 into various types of actions. For example, the processor can utilize the look-up table to identify one or more numerical parameters based on the supplementary signals and modify one or more numerical parameters contained in a software program provided by the surrogate computing element 230 to the low-level controller 115. Thus, for example, when the supplementary signals indicate that the power generation unit 215 should produce a certain level of power and provide a certain level of performance, the surrogate computing element 230 can use the look-up table to determine how much fuel should be provided to the power generation unit 215 for generating the level of power and level of performance as instructed by the high-level controller 105. The fuel information obtained via the look-up table can be incorporated into a software program that is generated by the surrogate computing element 230 and provided to the low-level controller 115 for execution. The low-level controller 115 can utilize the software program that may include various control commands to seamlessly change the amount of fuel provided to the power generation unit 215. The sensor 220 may be used by the low-level controller 115 to ensure that the power generation unit has achieved the appropriate operating state for generating the level of power and performance as instructed by the high-level controller 105.

The high-level controller 105, the surrogate computing element 230, and the low-level controller 115, constitute an exemplary non-homogeneous, multi-level system that allows the high-level controller 105 and the surrogate computing element 230 to interact with each other using relatively complex software, high-level communication protocols, and a large degree of flexibility in executing changes in hardware and software, while allowing the surrogate computing element 230 to interact with the low-level controller 115 with relatively less complex software and communication protocols, in accordance with the disclosure. The exemplary non-homogeneous, multi-level system also allows the low-level controller 115 to operate with minimal interruptions and with minimal changes in hardware and software.

FIG. 3 shows an exemplary flowchart 300 of a method of interaction between the high-level controller 105 and the low-level controller 115 in accordance with an exemplary embodiment of the disclosure. The method is generally directed at generating software in the high-level controller 105 and ensuring that providing the generated software to the low-level controller 115 and executing the generated software in the low-level controller 115 does not lead to adverse conditions in the low-level controller 115 and/or the power generation unit 215. Generally, any failure and/or malfunction of the power generation unit 215 should be avoided, particularly any failure and/or malfunction that may lead to an interruption in the distribution of electricity to customers.

In block 315, various protection operations associated with the high-level controller 105, the low-level controller 115, and/or the power generation unit 215 may be suspended. Suspension of these protection operations is generally directed at avoiding adverse conditions in the system 100 that may possibly occur as a result of using a software program generated in the high-level controller 105 and executed by the low-level controller 115. In one exemplary implementation, one or more protection devices (such as circuit breakers) may be inactivated so as to prevent tripping and power loss.

In block 320, the software program can be generated in the high-level controller 105. The software program may be generated for various reasons such as for rectifying defective operating software, providing a software update, and/or for introducing new features in operating software (improving long-term efficiency of the power generation unit 215, for example).

In block 325, the software program generated in the high-level controller 105 is transferred to the low-level controller 115 via the communications network 110 and is executed in the low-level controller 115.

In block 330 the various protection operations that were suspended are enabled one at a time. Each enabling operation is monitored by a decision block 345 to determine if executing the software program in the low-level controller 115 would have an adverse impact upon the operation of the power generation unit 215. For example, a first circuit breaker may be placed back in operation, and a determination made in accordance with block 345 to verify that the software program was executed successfully without adversely affecting the operation of the power generation unit 215. If successful, a second element, such as a new load, may be coupled into the power generation unit 215, and a determination made in accordance with block 345, to once again confirm that the software program execution remains successful. If a failure and/or malfunction is detected, measures can be taken in accordance with block 360 to correct software program errors. The correction may be carried out in the high-level controller 105 in accordance with block 320.

The operations indicated in block 330, block 345, block 360, block 320, and the block 325 are iteratively carried until the generated software program is executed successfully in the low-level controller 115 and critical protection elements that were disabled in block 315 have been enabled.

Upon successful completion of operations indicated in block 330, critical cooperative operations between the high-level controller 105 and the low-level controller 115 are enabled one at a time, as indicated in block 335. The success of the operations indicated in block 335 can be verified by using block 350. If unsuccessful, operations indicated in block 360, block 320, block 325, block 335, and block 340 are carried out once again to correct errors in the software program.

Upon successful completion of operations indicated in block 335, non-critical operations associated with the system 100 can be enabled one at a time as indicated in block 340. The success of the operations shown in block 340 can be verified via block 355 and errors addressed via block 360 and intervening blocks between block 360 and block 340.

FIG. 4 illustrates some exemplary elements that can be included in a computer configured to operate as the high-level controller 105 in accordance with an exemplary embodiment of the disclosure. It should be understood that in various exemplary embodiments, the high-level controller 105 may be configured as a server computer. Accordingly, some of the hardware elements described below with reference to FIG. 4 may be omitted and other elements that are typically used for operating a server computer may be used instead.

The high-level controller 105 may include a processor 405 capable of communicating with a memory 425. The processor 405 may be implemented as appropriate in hardware, software, firmware, or combinations thereof. Software or firmware implementations of the processor 405 may include computer-executable or machine-executable instructions written in any suitable programming language to perform the various functions described. In one embodiment, instructions associated with a function block language may be stored in the memory 425 and executed by the processor 405.

A memory 425 may store program instructions that are loadable and executable on the processor 405, as well as data generated during the execution of these programs. Depending on the configuration and type of the high-level controller 105, the memory 425 may be volatile (such as random access memory (RAM)) and/or non-volatile (such as read-only memory (ROM), flash memory, etc.). In some embodiments, the high-level controller 105 may also include additional removable storage 430 and/or non-removable storage 435 including, but not limited to, magnetic storage, optical disks, and/or tape storage. The memory 425 and associated computer-readable media may provide non-volatile storage of computer-readable instructions, data structures, program modules, and other data for the devices. In some implementations, the memory 425 may include multiple different types of memory, such as static random access memory (SRAM), dynamic random access memory (DRAM), or ROM.

The memory 425, removable storage 430, and non-removable storage 435 are all examples of non-transitory computer-readable storage media. Non-transitory computer-readable storage media may include volatile and non-volatile, removable and non-removable media implemented in any method or technology for storage of information such as computer-readable instructions, data structures, program modules or other data. Additional types of non-transitory computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the devices. Combinations of any of the above should also be included within the scope of non-transitory computer-readable media.

The high-level controller 105 may also include one or more communication connections 410 that may allow the high-level controller 105 to communicate with devices or equipment capable of communicating with the high-level controller 105. The connections can be established via various data communication channels or ports, such as USB or COM ports to receive connections for cables connecting a control device to various other devices on a network, such as the communications network 110. In one embodiment, the high-level controller 105 may include Ethernet drivers that enable the high-level controller 105 to communicate with other devices. According to various embodiments, the communication connections 410 may be established via one or more wired and/or wireless connection.

The high-level controller 105 may also include one or more input devices 415, such as a keyboard, mouse, pen, voice input device, and touch input device. The high-level controller 105 may further include one or more output devices 420, such as a display, printer, and speakers.

Turning to the contents of the memory 425, the memory 425 may include, but is not limited to, an operating system (OS) 426 (such as may be used in a server computer) and one or more application programs or services for implementing the features and aspects disclosed herein with reference to the high-level controller 105. Such applications or services may include high-level controller software 427 and data storage 428. The high-level controller software 427 may be executed by the processor 405 for providing supplementary signals and other information to the surrogate computing element 230. Data storage 428 may be used to store data pertaining to the power generation unit 215 for example. Such data may include current operating parameters of the power generation unit 215, historical information pertaining to the power generation unit 215, and predicted performance data. The historical information pertaining to the power generation unit 215 and the predicted performance data may be used to determine one or more of the supplementary signals and other information provided by the high-level controller software 427 to the surrogate computing element 230.

FIG. 5 illustrates some exemplary elements that can be included in a computer configured to operate as the surrogate computing element 230 in accordance with an exemplary embodiment of the disclosure. The processor 505, input devices 515, output devices 520, removable storage 530, and non-removable storage 535, and communication connection(s) 510 that are shown in FIG. 5 are identical or substantially similar to corresponding elements shown in FIG. 4 and described above. Consequently, these elements will not be described here. However, attention is drawn to the memory 525 that may be a part of the computer configured to operate as the surrogate computing element 230. The memory 525 may include, but is not limited to, an operating system (OS) 526 (such as may be used in a client computer) and one or more application programs or services for implementing the features and aspects disclosed herein with reference to the surrogate computing element 230. Such applications or services may include surrogate computing element software 527 and a look-up table 528. The surrogate computing element software 527 may be executed by the processor 505 for receiving the supplementary signals and other information from the high-level controller 105 and to generate software programs that are provided to the low-level controller 115. The look-up table 528 may be used in the manner described above when generating the software programs that are provided to the low-level controller 115.

FIG. 6 illustrates some exemplary elements that can be included in a computer configured to operate as the low-level controller 115 in accordance with an exemplary embodiment of the disclosure. The processor 605, input devices 615, output devices 620, removable storage 630, and non-removable storage 635, and communication connection(s) 610 that are shown in FIG. 6 are identical or substantially similar to corresponding elements shown in FIG. 4 and described above. Consequently, these elements will not be described here. However, attention is drawn to the memory 625 that may be a part of the computer configured to operate as the low-level controller 115. The memory 625 may include, but is not limited to, an operating system (OS) 626 (such as may be used in a client computer) and one or more application programs or services for implementing the features and aspects disclosed herein with reference to the low-level controller 115. Such applications or services may include low-level controller software 627. The low-level controller software 627 may be executed by the processor 605 for receiving software programs from the surrogate computing element 230 and for executing the received software programs.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the exemplary embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A system comprising:
   a low-level controller configured to execute a first version of control software for controlling at least a first operational aspect of a physical asset;
   a high-level controller configured to generate one or more supplementary signals; and
   a surrogate computing element configured to receive the one or more supplementary signals from the high-level controller, utilize the one or more supplementary signals to generate a second version of control software, and to provide the second version of control software to the low-level controller, the low-level controller further configured to utilize the second version of control software to control at least a second operational aspect of the physical asset,
   wherein the high-level controller is in communication with the low-level controller via the surrogate computing element, wherein the surrogate computing element discontinues providing the second version of control software to the low-level controller simultaneously with a high-level controller communication failure.

2. The system of claim 1, further comprising:
   at least one sensor coupled to the physical asset, the at least one sensor configured to provide to the high-level controller, one or more sensor output signals indicative of a performance of the physical asset in response to execution of at least one of the first version of control software or the second version of control software.

3. The system of claim 2, wherein the physical asset is a power generation unit and the one or more sensor output signals provided by the at least one sensor includes at least one signal indicative of a failure in the power generation unit.

4. The system of claim 2, wherein the one or more supplementary signals are generated by the high-level controller when the high-level controller is placed in an independent mode of operation.

5. The system of claim 4, wherein the high-level controller is configured to generate the one or more supplementary signals in part by monitoring the one or more signals provided by the at least one sensor.

6. The system of claim 2, wherein the surrogate computing element comprises a processor and a look-up table, the processor configured to use the look-up table to translate the one or more supplementary signals provided by the high-level controller into one or more control commands that are included in at least the second version of control software.

7. The system of claim 6, wherein the processor is further configured to use the look-up table when using the second version of control software.

8. A method comprising:
   utilizing a low-level controller to execute a first version of control software for controlling at least a first operational aspect of a physical asset;
   utilizing a high-level controller to generate one or more supplementary signals for controlling at least a second operational aspect of the physical asset;
   providing the one or more supplementary signals to a surrogate computing element that permits communication between the low-level controller and the high-level controller;
   utilizing the one or more supplementary signals in the surrogate computing element to generate a second version of control software;
   providing the second version of control software to the low-level controller; and
   utilizing the low-level controller to execute the second version of control software for controlling at least the second operational aspect of the physical asset;
   discontinuing providing the second version of control software to the low-level controller simultaneously with a high-level controller communication failure.

9. The method of claim 8, wherein the second version of control software includes the first version of control software.

10. The method of claim 8, wherein the surrogate computing element comprises a processor and a look-up table, the processor configured to utilize the look-up table and the one or more supplementary signals to modify one or more numerical parameters contained in the first version of control software.

11. The method of claim 10, wherein the second version of control software comprises the first version of control software containing the modified one or more numerical parameters.

12. The method of claim 8, wherein the physical asset is a power generation unit that provides a first level of performance when controlled by the low-level controller using the first version of control software and provides a second level of performance when controlled by the low-level controller using the second version of control software.

13. The method of claim 12, wherein each of the first level of performance and the second level of performance is defined at least in part by one of a mean time between failures (MTBF) of the power generation unit or a power generation output capacity of the power generation unit.

14. The method of claim 12, wherein the first level of performance is determined over a first period of time and the second level of performance is determined over a second period of time that is greater than the first period of time.

15. The method of claim 14, wherein the first period of time is defined at least in part by one of a number of days or a number of weeks, and the second period of time is defined at least in part by one of a number of months or a number of years.

16. A method comprising:
   utilizing a low-level controller to execute a first version of control software for controlling at least a first operational aspect of a physical asset;
   utilizing a high-level controller to generate a second version of control software for controlling at least a second operational aspect of the physical asset;
   providing the second version of control software to a surrogate computing element that permits communication between the low-level controller and the high-level controller;
   utilizing the surrogate computing element to provide to the low-level controller, the second version of control software; and
   utilizing the low-level controller to execute at least one of the first version of control software or the second version of control software for controlling the physical asset;
   discontinuing providing the second version of controller software to the low-level controller simultaneously with a high-level controller failure.

17. The method of claim 16, wherein the physical asset is a power generation unit that provides a first level of performance when controlled by the low-level controller using the first version of control software and provides a second level of performance when controlled by the low-level controller using at least one of the second version of control software or a combination of the first version of control software and the second version of control software.

18. The method of claim 17, wherein the second version of control software is an update software that updates the first version of control software.

19. The method of claim 18, wherein the second version of control software is a remedial software that remedies one or more defects in the first version of control software.

20. The method of claim 18, wherein the second version of control software is a supplementary software that adds supplementary features to the first version of control software.

* * * * *